Jan. 5, 1965   W. A. BISHMAN ETAL   3,164,198
TIRE CHANGER
Filed Nov. 23, 1962   6 Sheets-Sheet 1
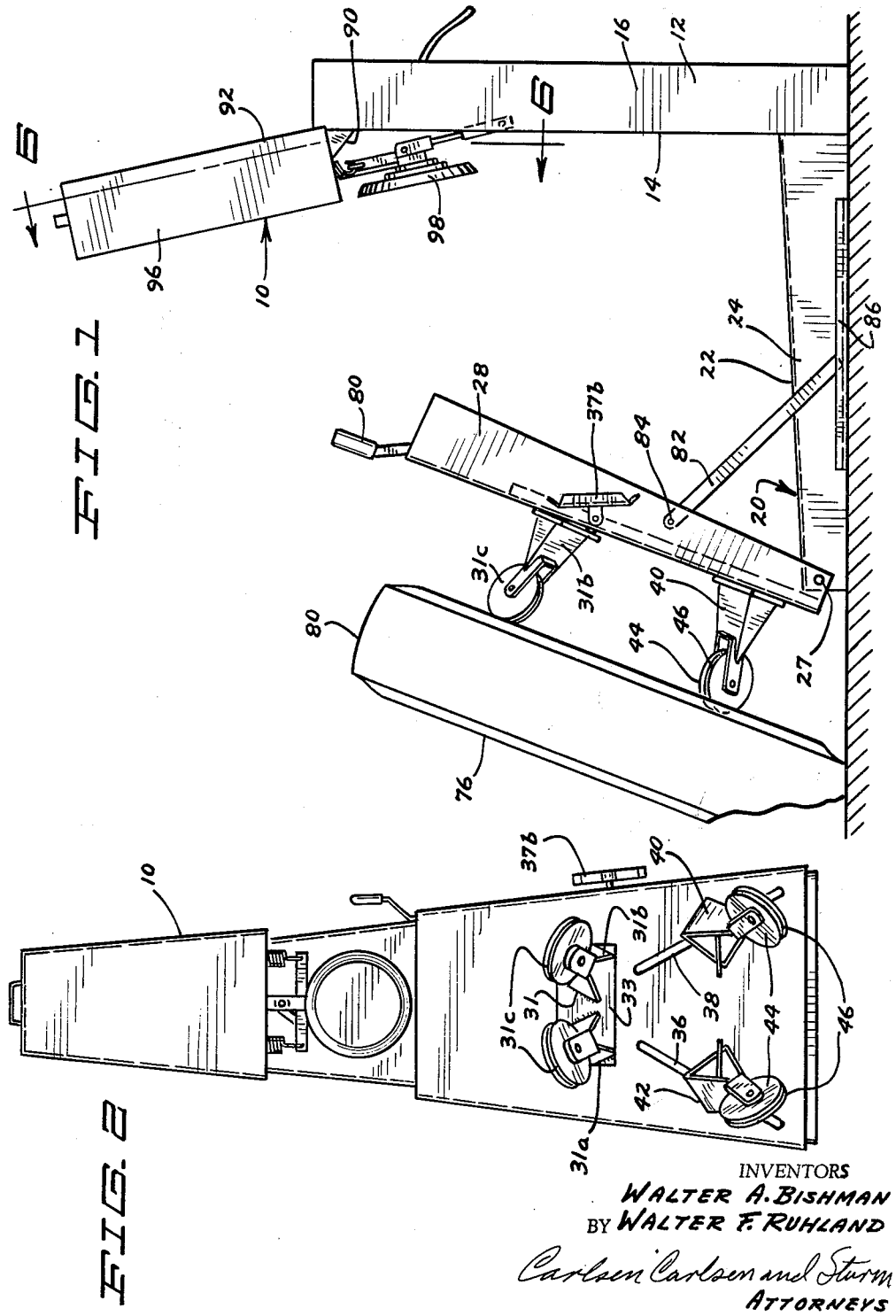
INVENTORS
WALTER A. BISHMAN
BY WALTER F. RUHLAND
Carlsen Carlsen and Sturm
ATTORNEYS

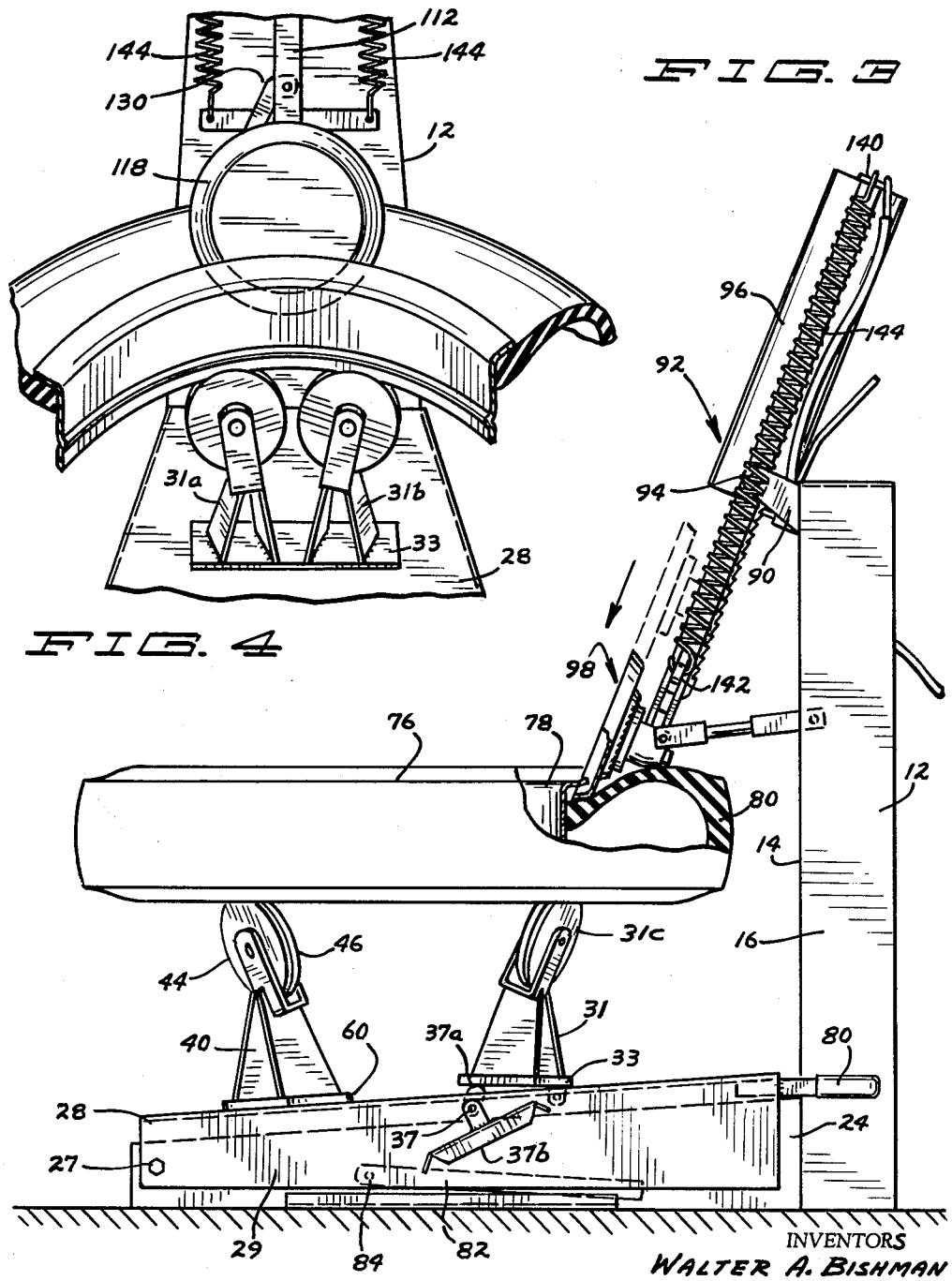

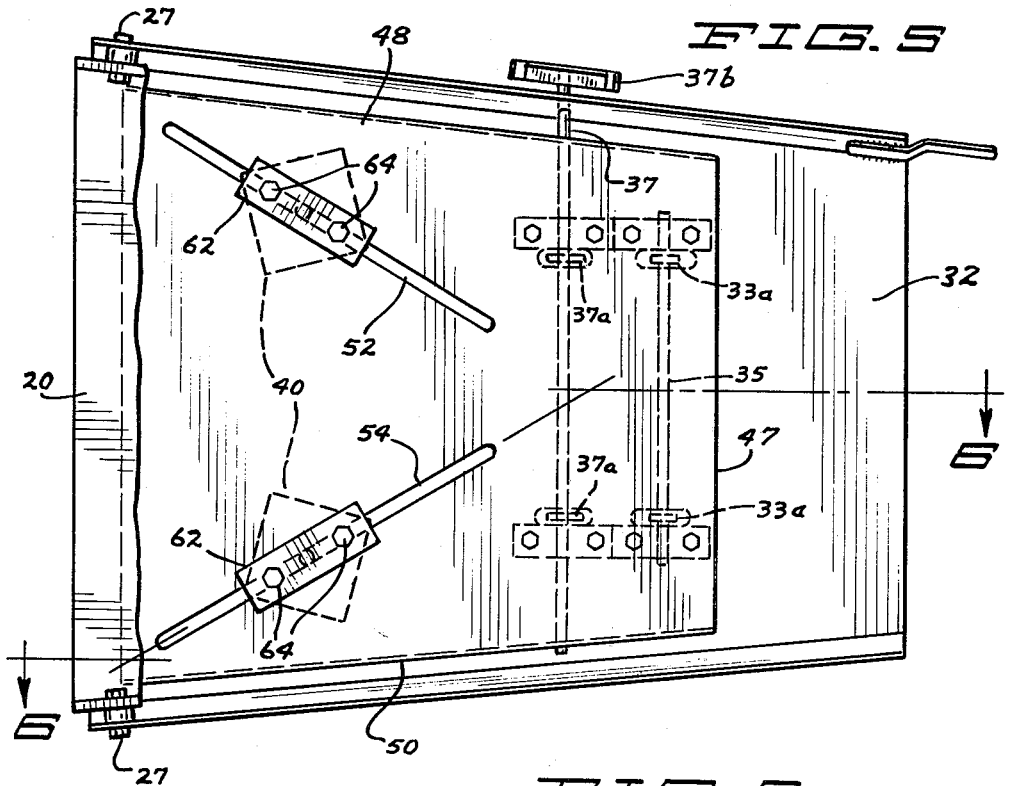
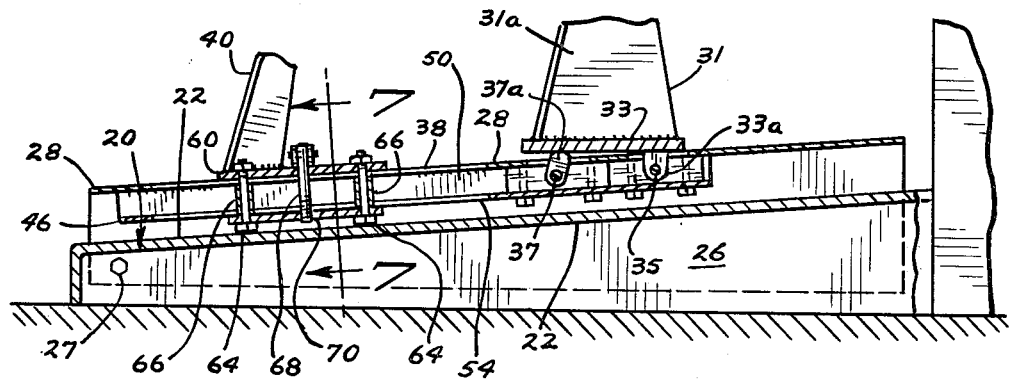
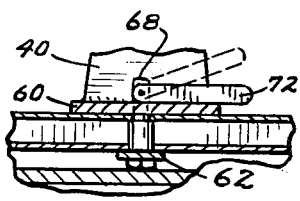

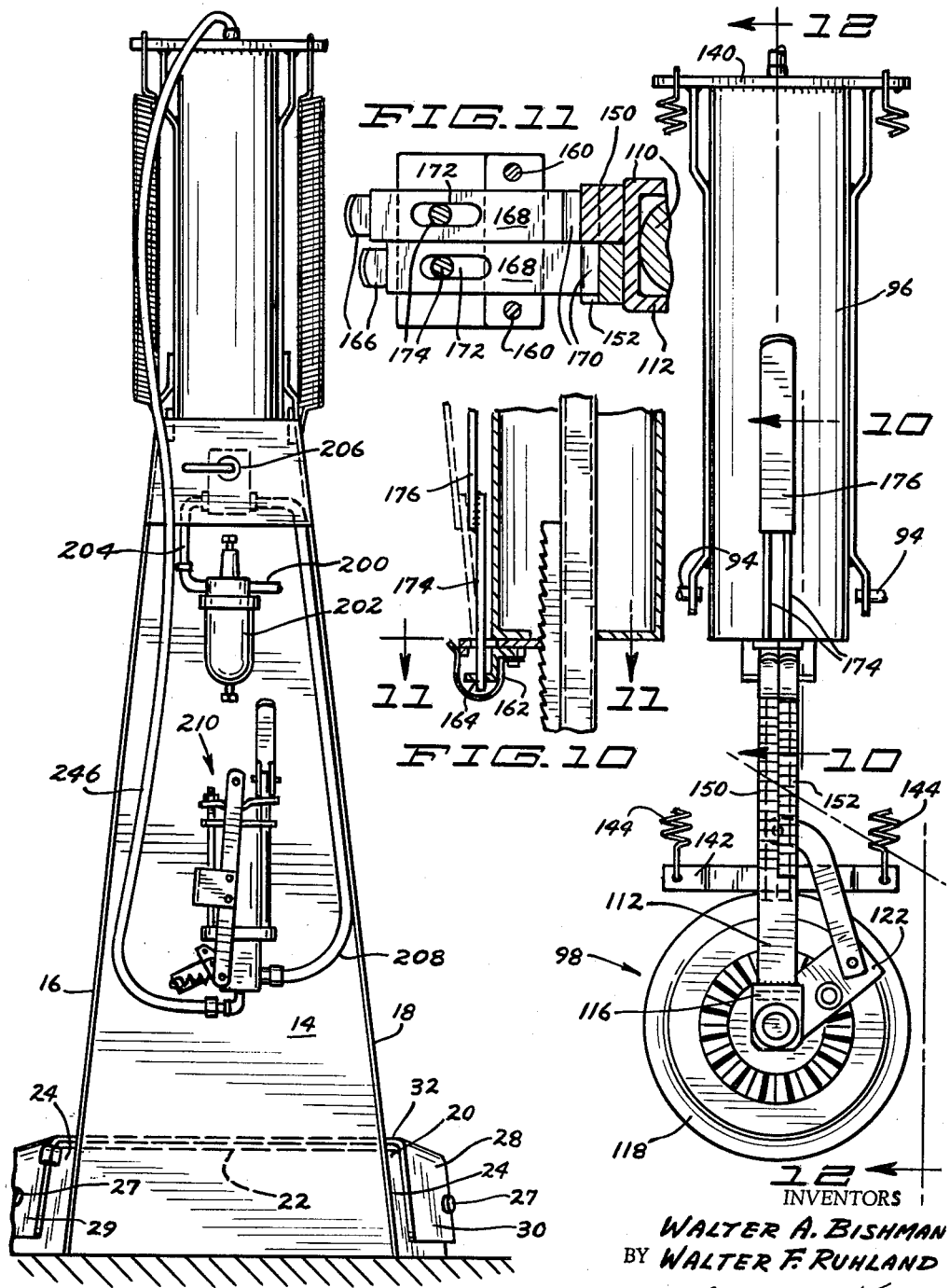

Jan. 5, 1965   W. A. BISHMAN ETAL   3,164,198
TIRE CHANGER
Filed Nov. 23, 1962   6 Sheets-Sheet 5
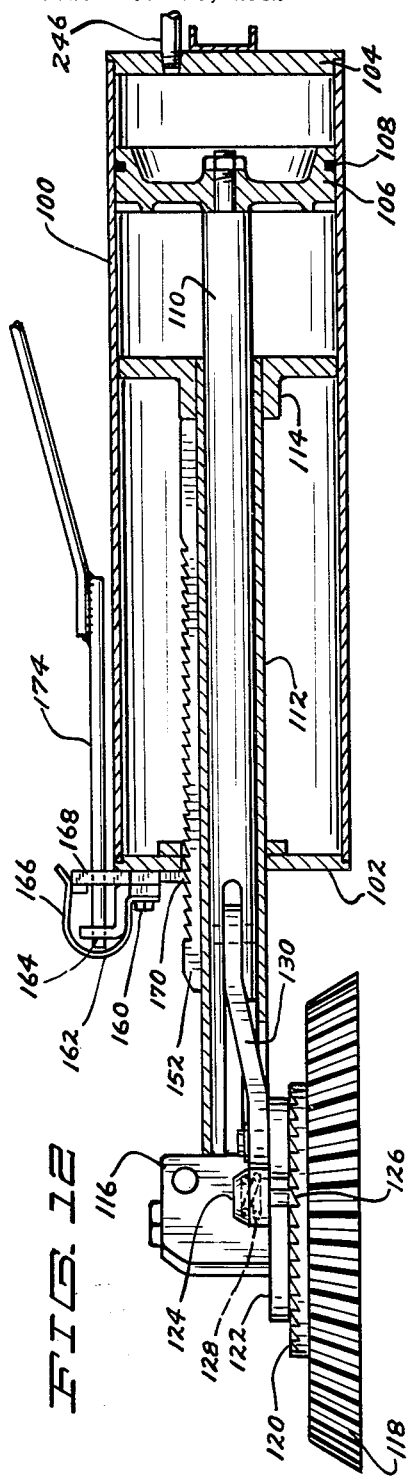
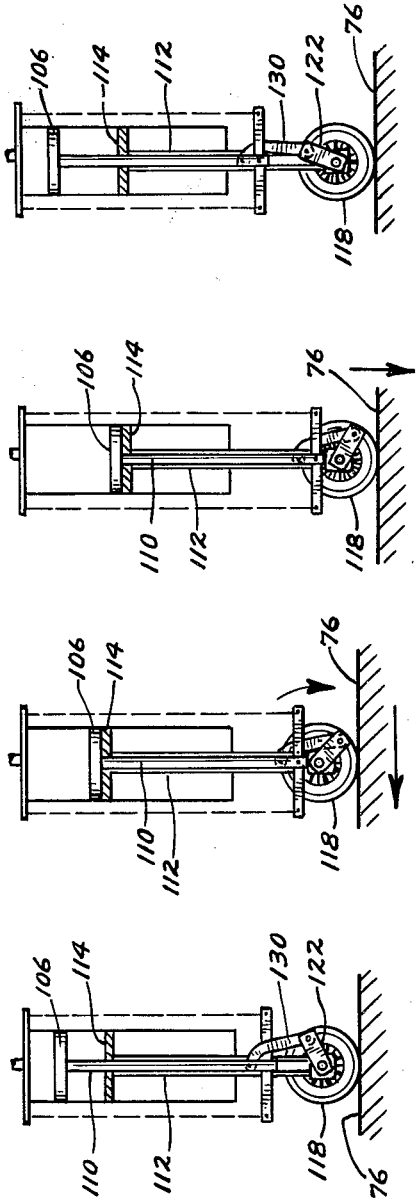
INVENTORS
WALTER A. BISHMAN
BY WALTER F. RUHLAND
ATTORNEYS

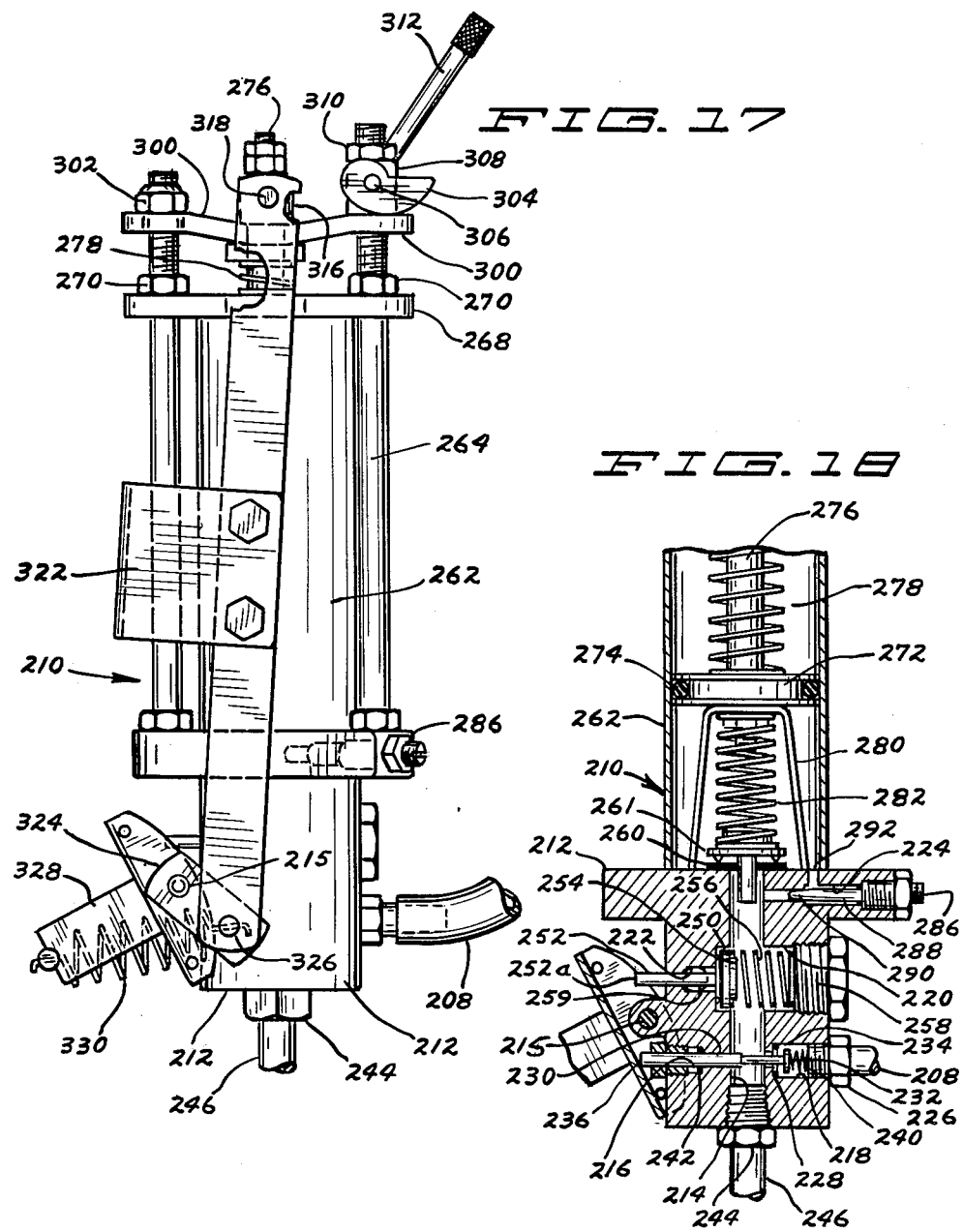

United States Patent Office 3,164,198
Patented Jan. 5, 1965

3,164,198
TIRE CHANGER
Walter A. Bishman, Minneapolis, and Walter F. Ruhland, Shakopee, Minn., assignors to Bishman Manufacturing Company, Osseo, Minn., a corporation of Minnesota
Filed Nov. 23, 1962, Ser. No. 239,602
11 Claims. (Cl. 157—1.17)

The present invention relates to tire repair equipment and more particularly to equipment designed for removing pneumatic tires from wheel rims.

Numerous machines have been designed in recent years for the purpose of demounting tires from the wheel rims of vehicles. The devices heretofore used for carrying out this work have in many cases been unsatisfactory or at least partially ineffective in operation. This is particularly true with regard to machines for performing work on relatively large tires such as truck tires and the like which because of their relatively large size are difficult to handle manually. In many prior machines, the tire must be lifted into place upon the apparatus which is, of course, fatiguing as well as time consuming.

Another shortcoming of many of the tire changing devices previously proposed is that even after the wheel has been mounted upon the machine, the further operation of the machine is only semi-automatic in that an operator is required to control each step of the operation. Another disadvantage of many of the devices now in use is that during the removal of a tire, the resiliency of the tire casing will force the tire removing tool back toward its retracted position.

In view of these and other deficiencies in the prior art not specifically enumerated, it is one object of this invention to provide an improved tire changer of the class described wherein a tire can be mounted upon the apparatus without the requirement that it be lifted into place by an operator.

It is another object of the present invention to provide an improved tire changing apparatus of the class described wherein after the tire has once been mounted on the apparatus, a series of tire-removal steps will be performed automatically by the apparatus.

It is yet a further object of the present invention to provide an improved tire changing apparatus including an actuator unit for forcing a tool mounted upon the apparatus into engagement with the tire and wherein the same actuator will also function to rotate the tire upon the apparatus so as to move different portions thereof into engagement with the tool.

It is still a further object of the present invention to provide an improved tire changing apparatus including a tire supporting assembly, a press tool assembly for removing a tire from its rim and means for reliably preventing the tire from forcing the press tool back to its retracted position.

It is a still further object of the present invention to provide an improved tire changing apparatus including a press wheel mounted upon an actuator for movement into engagement with the tire which is to be removed from its rim and including a means to prevent the press wheel from being driven back towards its retracted position by the resiliency of the tire and a release means for allowing the press wheel to be easily and quickly retracted when desired.

These and other more detailed and specific objects will be disclosed in the course of the following specification, reference being had to the accompanying drawings, in which—

FIG. 1 is a side elevational view of the apparatus embodying the present invention showing a wheel on which work is to be performed in position to be mounted upon the apparatus.

FIG. 2 shows an end elevational view of the apparatus of FIG. 1 with the wheel support assembly in the raised position.

FIG. 3 is a view similar to FIG. 1 partially in section but showing the wheel as it appears when the tire is being removed from the rim.

FIG. 4 is a partial perspective view showing a portion of the wheel and tire as it appears when supported on the apparatus with the press wheel in engagement with the tire.

FIG. 5 is a plan view of the wheel supporting assembly as seen from below.

FIG. 6 is a partial vertical sectional view taken on lines 6—6 of FIG. 5.

FIG. 7 is a partial vertical sectional view taken on line 7—7 of FIG. 6.

FIG. 8 is a partial vertical elevational view of the apparatus as seen from the side opposite that illustrated in FIG. 2.

FIG. 9 is a partial side elevational view of the press wheel and press wheel actuator as it is seen with the press wheel partially extended.

FIG. 10 is a partial vertical sectional view taken on line 10—10 of FIG. 9.

FIG. 11 is a partial horizontal sectional view taken on line 11—11 of FIG. 10.

FIG. 12 is a partial vertical sectional view of the press wheel and press wheel actuator as seen from the left side.

FIG. 13 is a diagrammatic illustration showing the press wheel, press wheel actuator and tire as they appear before the actuator is operated.

FIG. 14 is a view similar to FIG. 13 showing the movement of the actuator piston and press wheel when the piston first begins to move.

FIG. 15 is a view similar to FIG. 14 illustrating the positions of the actuator piston, press wheel, and tire after continued movement of the actuator piston.

FIG. 16 is a view similar to FIGS. 13 through 15 but showing the various parts as they appear when the actuator piston is retracted.

FIG. 17 is a side elevational view of the control valve assembly.

FIG. 18 is a longitudinal sectional view of the control valve assembly of FIG. 17.

Referring now to the figures which illustrate a preferred form of my invention, there is shown a tire changer 10 including a supporting framework 12 composed of a vertical member having a front wall 14 and sidewalls 16 and 18. The sidewalls 16 and 18 taper inwardly somewhat toward the top of the apparatus. At the lower end of the upright member is provided a base 20 including an upper wall 22 and a pair of substantially vertically disposed sidewalls 24 and 26 as can be best seen in FIGS. 1, 3 and 6. The upper wall of the base 20 is inclined slightly so that the end closest to the upright member is positioned somewhat above the opposite end thereof.

Pivotally mounted upon the base member 20 by means of a pair of suitable pivot pins 27 is a platform 28 including vertical sidewalls 29 and 30 and a substantially horizontally disposed center portion 32.

Pivotally secured upon the upward surface of the platform 28 is a bracket assembly 31 including a pair of laterally spaced apart bracket members 31a and 31b, each composed of a pair of upwardly extending members both of which are secured at their lower ends to a horizontal plate 33. At the upper end of each of brackets 31a and 31b is a wheel 31c having a generally V-shaped groove extending around the circumference thereof. An additional set of wheels 44 are spaced forwardly of the wheels 31a as will be described fully hereinbelow. The plate 33 includes a pair of spaced apart lugs 33a as best seen in FIGS. 5 and 6. Extending through the lugs 33a is a horizontally disposed pivot pin 35 which is affixed at each end to the platform 28. An adjustment rod 37 is mounted upon the support platform 28 for rotation about a horizontal axis. A pair of spaced apart cams 37a engage the lower surface of the plate 33 through suitable openings in the upper surface of the platform 28. A foot lever 37b which is rigidly affixed to one end of the rod 37 as shown in FIGS. 1 through 5 can be used to pivot the rod 37 so as to turn the cam members 37a upwardly thereby swinging the bracket assembly 31 in a clockwise direction about the pin 35 as seen in FIG. 3, the spacing can in this way be quickly changed between the wheels 31c and 44 so that the opposite edges of the same rim can be placed thereon although there is a difference in the diameter of each edge of the rim.

Slidably mounted upon the center portion 32 of the platform 28 within a pair of spaced apart and obliquely related slots 36 and 38 are a pair of vertically extending wheel support brackets 40 and 42. At the upper end of each of the brackets 40 and 42 is rotatably mounted a tire rim support wheel 44. A generally V-shaped circumferentially extending groove 46 is provided around the periphery of each of the wheels 44 to receive the lowermost edge of the tire rim upon which work is to be performed as best seen in FIGS. 1, 3 and 4.

Rigidly mounted upon the platform 28 and positioned below and in a plane parallel to the center portion 32 of the platform 28 is a plate 47 as best seen in FIGS. 5 and 6. The plate 47 includes a pair of vertically disposed sidewalls 48 and 50 which are secured as by welding to the platform 28. The plate 47 includes a pair of obliquely related slots 52 and 54 as best seen in FIGS. 5 and 6 positioned in vertical alignment with the slots 38 and 36, respectively. Each of the brackets 40 includes a generally horizontally disposed base member 60 best seen in FIGS. 3, 6 and 7. Positioned beneath each of the slots 52 and 54 are a pair of members 62 (FIG. 5). Connecting the members 60 with the members 62 are a pair of spaced apart vertically disposed bolts 64. Over each of the bolts 64 is mounted a sleeve 66. Extending between the centers of each of the members 60 and 62 are a pair of adjustment bolts 68, each being screw-threaded at 70 within one of the members 62. Pivotally secured to the upward end of each of the adjustment bolts 68 is a handle 72 which during use can be lifted about the pivotal connection between itself and the bolt 68 to the dotted line position of FIG. 7. Thus during operation, the brackets 40 can be moved within the slots 36, 54 and 38,. 52 to accommodate a wheel 76 including a metal rim 78 and an inflatable tire 80. Once the brackets 40 have been moved to the desired position, the handle 72 can be turned in the direction adapted to tightening a bolt 68 thereby drawing the members 62 upwardly against the under surface of the plate 47 so as to securely retain the brackets 40 in the desired position. This adjustment having once been made, need only be changed when a wheel of a different size is to be placed on the machine.

At the end of the platform 28 nearest the upright member 12 is affixed a handle 80 which an operator can use to raise the platform 28 into a position adapted to receive the tire 76, as shown in FIG. 1. When the platform 28 is thus raised, a brace 82 which is pivotally supported upon the platform 28 at 84 will swing downwardly engaging the lower surface of a guide 86 so as to support the platform 28 in the elevated position.

Mounted upon a bracket 90 which is itself rigidly affixed to the top of the frame member 12 is a tool support assembly 92. The assembly 92 is mounted for pivotal movement about a horizontal axis upon the bracket 90 by means of pivot pins 94. The tool support assembly 92 includes two major parts, a pneumatic actuator 96 and a tire operating tool assembly 98. The actuator assembly 96 as best shown in FIG. 12 includes a cylinder 100 which is closed at each end by means of end pieces 102 and 104 which are welded to the cylinder 100. Within cylinder 100 is slidably mounted a piston 106. The piston 106 is sealed within the cylinder by means of a resilient gasket such a rubber O-ring 108. Rigidly connected to the piston 106 is a rod 110 which extends axially through the cylinder 100. Slidably mounted over the rod 110 is stop assembly including a tubular member 112 and a collar 114 rigidly mounted upon one end thereof. The collar 114 is thus slidably mounted within the cylinder 100. Rigidly secured to the outward end of the member 112 is a bearing block 116 upon which a press wheel 118 is rotatably mounted. Upon the rearward surface of the press wheel 118 are provided a number of circularly disposed ratchet teeth 120. Mounted for rotation between the bearing block 116 and the press wheel 118 is a crankarm 122. At a point between the ends of the crankarm 122 is mounted a pawl assembly 124 including a pawl 126 which as best seen in FIG. 12 is yieldably biased towards the ratchet teeth 120 by means of a helical spring 128 within the assembly 124. Pivotally connected between the outward end of the crankarm 122 in the lowermost end of the actuator rod 110 is a link 130. The movement of the piston 106 within the cylinder 100 is thus adapted to rotate the press wheel 118 upon the bearing block 116.

Rigidly supported upon the upward end of the cylinder 100 is a cross bar 140 best seen in FIGS. 3 and 9. Rigidly affixed to the rod 110 near its lower end is a transversely disposed bar 142 best seen in FIGS. 3 and 9. Extending between the outward ends of the bars 140 and 142 are a pair of laterally spaced apart longitudinally extending springs 144. During operation, the springs 144 will function to yieldably bias the rod 110 and piston 106 upwardly away from the tire 76.

Referring now particularly to FIGS. 10, 11 and 12 it will be seen that a pair of longitudinally extending sets of ratchet teeth 150 and 152 are rigidly affixed to the forward surface of the member 112. The ratchet teeth of set 150 are positioned in alignment with the spaces between the teeth of the set 152.

Secured to the lower surface of the end piece 102 by means of a bolt 160 is a bracket 162 having an opening 164 in the lower end thereof. Also rigidly affixed to the bracket 162 are a pair of laterally spaced apart generally U-shaped springs 166. The upward ends of the springs 166 engage the outward ends of a pair of pawl members 168 which are slidably mounted within the bracket 162. The end portion 170 of the pawl members 168 are sharply pointed as best seen in FIG. 12 so as to engage the ratchet teeth 150 and 152. Each of the pawl members 168 is provided with a central opening 172. Through openings 172 extend a pair of laterally spaced apart vertically disposed rods 174 as seen in FIGS. 9 through 12. The upper ends of the rods 174 are rigidly secured as by welding to a handle member 176. As seen in FIG. 10, the ratchet teeth 150 and 152 are constructed such that the downward movement of the member 112 will be permitted, with the pawl members 168 being forced against the spring member 166 while upward movement of the member 112 is prevented by the pawl members 168 until the handle member 176 and rods 174 are swung rearwardly by the operator, to the dotted line position of FIG. 10. In this position, the rods 174 will draw the pawl members 168 out of engagement with the ratchet teeth member 150 and 152.

As can be best seen in FIG. 8, air under pressure is supplied to the tire changing apparatus 10 from a suitable source of compressed air (not shown) through an inlet tube 200. From the tube 200 the air passes through an air line lubricator 202 of any suitable well known construction. The air passing out from the lubricator 202 passes through a line 204 to a shut-off valve 206. From the valve 206 the compressed air passes through a line 208 to a control valve 210.

The control valve 210 includes a valve block 212 having a central bore 214 and lateral bores, 216, 218, 220, 222 and 224. Within the bore 218 is threaded a hose coupling 226 of a suitable known construction. Adjacent the inward end of the bore 218 is provided an annular valve seat 228.

Slidably mounted within the bore 216 is a valve member 230. Valve member 230 extends across the bore 214 and includes a head 232 which is positioned within the bore 218. A sealing washer 234 is affixed within the annular valve seat 228 for cooperation with the valve head 232 to control the flow of air from the inlet line 208 through coupling 226 into the bore 214. As clearly shown in FIG. 18, the valve member 230 includes an end portion 236 which during some phases of operation will abut against a portion of an over center lever 238 which is itself pivotally mounted upon the valve block 212 by means of a pin 215. A spring 240 is mounted between the coupling 226 and the valve head 232 for the purpose of yieldably biasing the valve member 230 toward the seated position upon the valve seat 228. The valve member 230 can be suitably sealed within the bore 216 by means of packing member 242.

Threaded with the lower end of the bore 214 is a coupling member 244 for securely retaining an air line 246 in communication with the bore 214. As can be seen by inspection of FIG. 18, air passing into the bore 214 from line 208 will be free to pass through the coupling 244 into line 246. From the line 246 the air will pass into the chamber defined by the upward end of the cylinder 100 and the piston 106 thereby urging the piston 106 downwardly.

The bore 222 is provided with an annular inwardly facing valve seat 250. Slidably mounted within the bore 122 is a poppet valve 252 including a valve head 254 adapted to seal valve seat 250 when moved towards the left in FIG. 18. A spring 256 is mounted within the bore 220 between a suitable sealing plug 258 and the valve head 254 for the purpose of biasing the poppet 252 toward the left as seen in FIG. 18 to the seated position. A vent duct 259 communicates between the bore 222 and the exterior of valve 210 to allow air to escape into the atmosphere from the bore 214 when the poppet 252 is lifted from the seat 250.

Within the end of the bore 214 opposite the line 246 is mounted a poppet valve 261. The outward end portion 252a of the poppet 252 is adapted to engage the inward surface of the over center lever 238 during some phases of operation as will be described hereinbelow. Secured to the end of the bore 214 under the valve 261 is a flexible sealing member such as a rubber ring 260. A cylinder 262 is rigidly secured to the end of the block 212 concentric with the bore 214 by means of a pair of spaced apart mounting bolts 264 suitably connected at one end to the block 212 and at the other end to a cylinder end piece 268. Nuts 270 can be threaded upon the ends of the bolts 264 for the purpose of retaining the end piece 258 securely against the upward end of the cylinder 262.

Slidably mounted within the cylinder 262 is a plunger 272 which is sealed by means of a circumferentially extending rubber O-ring 274. A connecting rod 276 is securely fastened at one end to the plunger 272 and projects outwardly at the other end through an opening in the end piece 268. A spring 278 is mounted concentrically over the rod 276 for yieldably biasing the plunger 272 towards the bore 214.

Rigidly connected to the plunger 272 is a spacer 280 which has the general form of an inverted U. The lowermost ends of the spacer 280 abut against the end of the block 212 to limit the downward movement of the plunger 272 within the cylinder 262. A suitable spring 282 is mounted between the valve member 261 and the plunger 272 for the purpose of urging the valve member 261 into engagement with the sealing ring 260.

Within the bore 224 is threaded a metering valve 286 including a tapered needle portion 288 adapted to control the flow of air through a metering orifice 290 at the inward end of the bore 224. The bore 224 communicates with the interior of the cylinder 262 through a duct 292.

As can be seen in FIG. 17 the upward end of the spring 278 and the rod 276 project through a suitable opening in end piece 268. Loosely fitted over the end of the rod 276 above the spring 278 is an adjustment arm 300. The adjustment arm 300 is loosely secured at one end thereof upon the end of the bolt 264 by means of a nut 302. The opposite end of the arm 300 is mounted for vertical adjustment by means of a spiral cam 304 rigidly mounted upon a pin 306 which is itself rotatably supported within a block 308 affixed to the end of a bolt 264 by means of nut 310. An adjustment lever 312 is rigidly secured to the opposite end of the pin 306 so that an operator can turn the pin 306 and cam 304 by moving the lever 312 thereby either raising or elevating the right end of the arm 300 as seen in FIG. 17 so as to vary the compression of the spring 278.

Rigidly secured to the outward end of the rod 276 is a bracket member 316. Rigidly supported upon the bracket 316 are a pair of laterally extending and coaxial pivot pins 318 (only one of which is shown). Pivotally mounted upon the pins 318 are a pair of parallel links 320 (only one of which is shown). Each of the links 320 is positioned in a plane parallel the axis of the cylinder 262. The links 320 are rigidly connected together at their centers by means of a generally U-shaped yoke 322. The lower end of each of the links 320 is pivotally connected to one of a pair of identical laterally spaced apart and parallel links 324 by means of a pair of coaxially aligned pivot pins 326 (only one of which is shown). Each of links 324 is mounted for rotation upon the pin 215 on opposite sides of the over center lever 238. Extending outwardly from the base of the over center lever 238 is a spring bracket 328. Rigidly connected between the outward end of the spring 328 and one of the pivot pins 326 is a spring 330.

It should be understood that during operation the links 324 will move independently of the over center lever 238 since these parts are mounted for independent rotation upon the pin 215. When, however, the pins 326 at the lower ends of the links 320 move upwardly into approximate alignment with a horizontal plane extending through the pin 215, the spring 330 will cause the over center lever 238 to swing rapidly in a clockwise direction about the pin 215 as seen in FIGS. 17 and 18. This will cause the poppet 252 to be unseated and the valve member 230 to be seated. In a similar manner, the downward movement of the links 320 to a position in which the pins 326 move somewhat below a horizontal plane extending through the pin 215 will cause the tension upon spring 330 to snap the over center lever 238 in a counterclockwise direction back to its original position as shown in FIGS. 17 and 18. The poppet 252 will then be moved to the closed position and the valve member 230 will be moved to the open position.

*Operation*

Before the wheel 76 is placed upon the apparatus, the removable portion of the wheel rim should be disconnected and removed. The wheel 76 can then be placed with the non-removable rim edge upon the wheels 31c and 44 as shown in FIG. 1. The tire 76 is then adjusted as necessary to place the edge of the rim 78 into the circumferentially extending grooves of each of the wheels 31c and 44. If the position of wheels 44 do not correspond with the lower portion of the wheel rim 78, the brackets 40 and 42 can be moved as required within the slots 36 and 38 until the wheels are properly positioned. When the wheels 44 are correctly positioned, brackets 40 and 42 can be locked in place by turning the levers 72 so as to tighten the bolts 68 of each of the brackets 40 and 42. The upwardly positioned bead of the tire 78 can then be broken from the rim by operating the actuator as will be described fully herein below in connection with the removal operation.

After the first bead of the tire has been thus broken from the rim, the wheel 76 can be removed from the supporting wheels 31c and 44, inverted and replaced thereon so that the opposite side of the rim is uppermost as shown in FIGS. 3 and 4. If the edge of the rim 78 with the removable portion is smaller in diameter than the other edge, the wheels 31c can be quickly pivoted toward the wheels 44 by turning lever 37b to accommodate for this difference in diameter.

To move the support platform 28 and tire 76 to the operating position shown in FIGS. 3 and 4 the operator need only lift the lower end of the link 82 out of contact with the track 86 and then pivot the platform 28 clockwise about the pivots 27.

With the rim 78 and tire 80 in position upon the support wheels as shown in FIGS. 3 and 4 the press wheel 112 is positioned between the upper rim flange and the bead of the tire casing substantially shown in FIG. 4. Unless previously connected, the inlet line 200 is connected to a source of compressed air.

The valve 206 is then opened allowing compressed air to pass through the air lubricator 202 into line 204 and line 208. From line 208 the compressed air passes through the bore 218 over valve seat 228 and into bore 214 when the over center lever 238 is positioned as shown in FIGS. 17 and 18. From the bore 214, the air under pressure passes outwardly through the line 246 into the cylinder 100 thereby forcing the piston 106 and rod 110 downwardly. The first downward movement of the piston 106 and rod 110 will drive the link 130 and crank arm 132 in a clockwise direction as shown in FIG. 13, thereby rotating the press wheel in a clockwise direction as seen in the figure. The rotational movement of the press wheel 118 will in turn cause the wheel 76 to rotate in a clockwise direction as seen in FIG. 4 about its own center.

When the piston 106 hits the stop 114, the member 112 and block 116 will be driven downwardly with the piston 106 as best seen in FIG. 15 thereby forcing a portion of the tire downwardly and toward the open side of the rim 78. As the member 112 moves downwardly, the pawl members 168 through the engagement with the teeth 150 and 152 will reliably prevent the press wheel 118 from being forced toward the cylinder 100.

After the piston 106 has forced the stop 114 member 112 and press wheel 118 downwardly a short distance, the resistance offered by the tire will rapidly increase thereby causing a substantial rise in air pressure within the cylinder 100 above the piston 106. The same pressure will, of course, be present within the bore 114 and cylinder 262 below the plunger 272. The pressure increase within the cylinder 262 will thus force the plunger 272 upwardly against the spring 278. As the plunger 272 moves upwardly against spring 278 the links 320 will, of course, be carried upwardly. The upward movement of the links 320 will pivot links 324 in a counterclockwise direction about the pin 215. As the pins 326 at the lower end of the links 230 move upwardly the spring 330 will be elongated until the pins 326 reach a position somewhat above the horizontal plane extending through the pin 215 at which time the spring 330 will cause the over center lever 238 to pivot rapidly in a clockwise direction about pivot 215 thereby opening the valve seat 250 and closing the valve seat 228 so as to interrupt the flow of air from line 208 into the bore 214 and permitting the air stored within the cylinder 100 to be exhausted through bore 214 and duct 259.

When the air pressure in the bore 214 drops below the pressure of the air cylinder 262 beneath the plunger 272, the spring 282 will force the valve 261 against its seat. The air trapped within the cylinder 262 below the plunger 272 will be allowed to escape at a controlled rate through the ducts 292 and metering orifice 290. The needle 288 will ordinarily be set to allow the air within the cylinder 100 and above the piston 106 to reach atmospheric pressure before a plunger 272 has moved downwardly a sufficient distance to reset the valve members 252 and 230 to the positions shown in FIG. 18. If it is desired that the plunger 272 move to its original position more quickly, the needle 288 should be partially withdrawn. On the other hand, the needle 288 should not be opened so far that the movement of the plunger 272 will cause the cylinder 100 to be refilled before the springs 144 have drawn the piston 106 to its retracted position as shown in FIG. 16.

The piston 106 thus continues to reciprocate automatically to perform the following functions. First, a downward movement to cause rotation of the press wheel and tire. Second, a continued downward movement of the piston and entire press wheel assembly to cause a portion of the tire casing nearest the press wheel to be lowered on the wheel rim. Third, release of air pressure from within the cylinder 100 above the piston 106 thereby allowing the springs 144 to retract the piston. The cycle begins again with the piston 106 moving downwardly to rotate the press wheel and tire so that another portion of the tire is then brought into place below the press wheel.

The pressure exerted by the press wheel upon the tire will be controlled by the force exerted upon the plunger 272 by the spring 278. Thus if the spring 278 exerts a greater force against the plunger 272 the over center lever 238 will not swing in a clockwise direction until more pressure is built up within the cylinder 262 below the plunger 272. Under these conditions a greater force will be exerted by the press wheel 118 upon the tire 78. If the force exerted by spring 278 upon the plunger 272 is decreased, the plunger 272 will move upwardly a given distance in the cylinder 262 responsive to a pressure rise of a smaller magnitude. The compression of the spring 278 is varied as desired by turning the control handle 312 to thereby adjust the position of the cam 304 relative to the member 300. Thus, to increase the tension exerted by the spring 278 on the plunger 272 the handle 312 is moved in a clockwise direction in FIG. 17. To reduce the tension of the spring 278, the handle 312 is moved in a counterclockwise direction as seen in FIG. 17.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A tire repair apparatus comprising in combination a supporting framework, an actuator mounted upon said framework, said actuator including a piston slidably mounted therein, an actuator rod rigidly connected to said piston, a stop assembly mounted for reciprocal movement with respect to said actuator, said stop assembly having a portion adapted to operatively engage said piston whereby said stop assembly will move with said piston when the piston has been moved into engagement with the stop assembly, a bearing means rigidly mounted upon said stop assembly, a press wheel rotatably mounted upon said bearing means and a means operatively connecting said actuator rod and said press wheel for rotating said press wheel when said piston moves relative to said stop assembly, and means on said apparatus for rotatably supporting a tire upon said apparatus.

2. An apparatus removing a tire from a wheel rim comprising in combination, a supporting framework including a horizontally disposed base member and a generally vertically disposed member rigidly connected thereto, a pluarlity of horizontally spaced apart wheels rotatably mounted upon said base member for rotation in substantially upright planes, each of said wheels being adapted to receive a portion of the rim, an actuator assembly mounted upon said upright member, a rotary press wheel mounted upon said actuator for rotation in a substantially upright plane, and means in said actuator assembly for moving the press wheel into engagement with said tire and then rotating the press wheel when said rim is mounted upon said wheels, said tire tool being thereby adapted to remove the casing of said tire from the rim thereof.

3. A tire repair apparatus comprising in combination a supporting framework, a tire support assembly mounted upon said framework for supporting a tire for rotation about a vertical axis, said tire supporting assembly including a plurality of spaced apart wheels mounted for rotation in substantially vertical planes, means for adjusting the spacing between the wheels whereby tires of different sizes can be placed thereon, means for releasably locking said wheel adjusting means to regulate the spacing between said wheels, and a tire operating tool movably mounted upon said framework for engagement with said tire when tire is mounted upon said wheels.

4. A tire repair apparatus comprising in combination a supporting framework, an actuator mounted upon said framework, a tire support assembly, a tire operating tool operatively connected to said actuator for performing work on a tire mounted upon said assembly, said assembly including a plurality of spaced apart wheels positioned for rotation in substantially vertical planes with each of the wheels being adapted to receive a portion of the rim of said tire, at least one of said wheels being mounted upon said framework for pivotal movement about a transverse axis and adjustment means operatively connected between said wheels and said framework for changing the position of said wheels about said horizontal axis to thereby regulate the spacing between said wheels.

5. In a tire changing apparatus having a supporting framework and a tire support assembly on which a tire can be rotatably mounted, the combination of a cylinder having a piston mounted therein, sealing means between the piston and the cylinder, an actuator rod connected to the piston and extending out through one end of said cylinder, duct means for supplying compressed air to said cylinder, stop means slidably mounted with respect to said cylinder, said stop means being adapted to move with the piston when the piston is moved in a predetermined direction, a portion of said stop means being positioned externally of said cylinder, a press wheel mounted for rotation upon said portion of said stop means, a crank arm rotatably mounted upon said portion of said stop means for rotation about the axis of rotation of said press wheel, a link pivotally connected between the outward end of said crank arm and one end of said actuator rod and means operatively connected to said crank arm to said press wheel to turn said press wheel about the center thereof when said piston is moved relative to said stop assembly.

6. The apparatus according to claim 5 wherein said means comprises a plurality of circularly disposed ratchet teeth rigidly mounted upon said press wheel and a pawl member mounted upon said crank arm and yieldably biased into engagement with said ratchet teeth.

7. The apparatus according to the claim 5 wherein a plurality of ratchet teeth are provided upon said stop means and a pawl member is mounted upon said cylinder in a position adapted to operatively engage said ratchet teeth and said ratchet teeth being constructed to coact with said pawl whereby said stop means will be permitted to move outwardly of said cylinder only and the handle assembly for withdrawing said pawl member from engagement with said ratchet teeth.

8. A tire changing apparatus comprising in combination a supporting framework, a wheel supporting assembly mounted upon said framework for supporting a wheel for rotation thereon, an air cylinder mounted upon said framework in spaced relationship from said wheel supporting assembly, a piston slidably mounted within said cylinder, a stop member slidably mounted with respect to said cylinder, said piston being adapted to engage said stop member, a piston rod connected to said piston and extending out through one end of said cylinder, a press wheel mounted for rotation upon a portion of said stop assembly, means operatively connecting the press wheel with the piston rod for rotating the press wheel when the piston moves relative to the stop member in one direction, means yieldably biasing said piston in a direction adapted to retract said piston into said cylinder, means for supplying air under pressure to said cylinder, means for venting air from within said cylinder after the pressure has reached a predetermined value, the yieldable biasing means being adapted to move said piston to said retracted position when air has been vented through said means, whereby the initial extension of said piston rod will cause said press wheel to rotate thereby turning said tire upon said support assembly and the continued movement of said piston after engaging said stop member will cause said press wheel to exert a greater force against said tire.

9. A tire repair apparatus for use with a source of air under pressure comprising in combination a supporting framework, a tire support assembly mounted upon said framework for rotatably supporting a tire upon said framework, a pneumatic cylinder movably mounted upon said framework, said cylinder including a piston, a piston rod connected to said piston, a stop assembly including a collar portion and an elongate portion projecting out of said cylinder, a press wheel mounted for rotation on the outward end of said elongate portion, a means operatively connected to said piston rod with said press wheel for rotating said press wheel when said piston is moved in one direction relative to said stop assembly, duct means communicating with said cylinder for supplying compressed air thereto, valve means communicating with said duct, said valve means being adapted to be connected to said source of air under pressure, means in said valve for interrupting the supply of air from said source to said duct when said pressure within said valve reaches a predetermined value and for simultaneously allowing the air within said cylinder to escape and means for again connecting said source to said duct when the pressure within said cylinder has reached atmospheric pressure and for simultaneously sealing said valve and cylinder to prevent the escape of air therefrom.

10. A tire changing apparatus comprising in combination a supporting framework having a base platform connected to an upright frame member, a plurality of horizontally spaced apart support wheels journaled for rotation in substantially vertical planes upon the platform to jointly support for rotation about an upright axis a tire carrying wheel rim by engaging one side thereof, power actuated extensible means mounting a press wheel on the upright frame member above the support wheels for movement of the press wheel between a raised position and a lowered position in edgewise engagement with the upper side wall of a tire mounted on said rim, and drive means mounted on the upright frame member and operatively connected to the press wheel for power rotating the press wheel while in such engagement with the tire.

11. The subject matter of claim 10 wherein said base platform is hingedly connected to supporting framework for movement between a substantially horizontal operating position and an upright position for receiving the wheel rim on said support wheels.

References Cited in the file of this patent

UNITED STATES PATENTS

| | | |
|---|---|---|
| 2,783,830 | Pozerycki et al. | Mar. 5, 1957 |
| 2,920,664 | Lomen et al. | Jan. 12, 1960 |
| 3,086,578 | Breazeale et al. | Apr. 23, 1963 |
| 3,100,520 | May et al. | Aug. 13, 1963 |

FOREIGN PATENTS

| | | |
|---|---|---|
| 1,217,669 | France | May 5, 1960 |